(12) United States Patent
Ma et al.

(10) Patent No.: US 10,101,059 B2
(45) Date of Patent: Oct. 16, 2018

(54) THERMALLY DRIVEN HEAT PUMP FOR HEATING AND COOLING

(75) Inventors: Hongbin Ma, Columbia, MO (US); Joseph A. Boswell, San Francisco, CA (US); Peng Cheng, Coumbia, MO (US)

(73) Assignees: The Curators of the University of Missouri, Columbia, MO (US); Thermavant Technologies LLC, Columbia, MO (US)

( * ) Notice: Subject to any disclaimer, the term of this patent is extended or adjusted under 35 U.S.C. 154(b) by 2517 days.

(21) Appl. No.: 12/745,168

(22) PCT Filed: Nov. 26, 2008

(86) PCT No.: PCT/US2008/084968
§ 371 (c)(1),
(2), (4) Date: Jun. 6, 2011

(87) PCT Pub. No.: WO2009/070728
PCT Pub. Date: Jun. 4, 2009

(65) Prior Publication Data
US 2011/0259039 A1    Oct. 27, 2011

Related U.S. Application Data

(60) Provisional application No. 60/990,407, filed on Nov. 27, 2007.

(51) Int. Cl.
*F25B 33/00* (2006.01)
*F25B 1/08* (2006.01)
*F25B 15/02* (2006.01)

(52) U.S. Cl.
CPC ............... *F25B 1/08* (2013.01); *F25B 15/02* (2013.01); *F25B 2341/0011* (2013.01);
(Continued)

(58) Field of Classification Search
CPC .... F25B 1/08; F25B 15/02; F25B 2341/0015; F25B 2341/0011
(Continued)

(56) References Cited

U.S. PATENT DOCUMENTS 1,777,239 A    9/1930  Weir
1,870,265 A *  8/1932  Seligmann ...................... 62/109
(Continued)

FOREIGN PATENT DOCUMENTS

WO    2009070728 A1    6/2009

OTHER PUBLICATIONS

NPL—3M Novec 7000 Engineered Fluid, Sep. 2009, pp. 1-6.*
(Continued)

*Primary Examiner* — Larry Furdge
(74) *Attorney, Agent, or Firm* — Senniger Powers LLP

(57) ABSTRACT

A thermally driven heat pump includes a low temperature evaporator for evaporating cooling fluid to remove heat A first heat exchanger located at an outlet of a converging/diverging chamber of a first ejector receives a flow of primary fluid vapor and cooling fluid vapor ejected from the first ejector for condensing a portion of the cooling fluid vapor An absorber located in the first heat exchanger absorbs cooling fluid vapor into an absorbing fluid to reduce the pressure in the first heat exchanger A second heat exchanger located at an outlet of a converging/diverging chamber of a second ejector receives primary fluid vapor and cooling fluid vapor ejected from the second ejector for condensing the cooling fluid vapor and the primary fluid vapor A separator in communication with the second ejector, the low temperature evaporator and the primary fluid evaporator separates the primary fluid from the cooling fluid.

15 Claims, 10 Drawing Sheets

(52) U.S. Cl.
CPC ..... *F25B 2341/0015* (2013.01); *Y02A 30/277* (2018.01); *Y02B 30/62* (2013.01)

(58) Field of Classification Search
USPC .......................... 62/101, 102, 141, 495, 500
See application file for complete search history.

(56) References Cited

U.S. PATENT DOCUMENTS

| | | | |
|---|---|---|---|
| 1,952,214 A * | 3/1934 | Nelson | 62/102 |
| 2,605,618 A * | 8/1952 | Burggrabe | 62/500 |
| 2,931,190 A | 4/1960 | Dubitzky | |
| 3,199,310 A | 4/1965 | Schlichtig | |
| 3,216,649 A * | 11/1965 | Foa | 417/161 |
| 3,440,832 A | 4/1969 | Aronson | |
| 3,741,289 A | 6/1973 | Moore | |
| 4,173,994 A | 11/1979 | Hiser | |
| 4,290,273 A | 9/1981 | Meckler | |
| 4,329,851 A * | 5/1982 | Bourne | 62/101 |
| 4,336,837 A | 6/1982 | Koenig | |
| 4,395,648 A * | 7/1983 | Marks | 310/10 |
| 4,761,970 A | 8/1988 | MacCracken | |
| 4,795,618 A | 1/1989 | Laumen | |
| 4,921,041 A | 5/1990 | Akachi | |
| 5,240,384 A | 8/1993 | Tuzson | |
| 5,322,222 A * | 6/1994 | Lott | 239/403 |
| 5,444,987 A | 8/1995 | Alsenz | |
| 5,463,880 A * | 11/1995 | Nishino et al. | 62/484 |
| 5,586,442 A | 12/1996 | Nicodemus | |
| 5,673,566 A | 10/1997 | Eames et al. | |
| 5,737,840 A | 4/1998 | Akachi | |
| 5,921,315 A * | 7/1999 | Dinh | 165/104.21 |
| 6,138,456 A * | 10/2000 | Garris | 60/649 |
| 6,966,199 B2 * | 11/2005 | Takeuchi | 62/500 |
| 7,140,197 B2 | 11/2006 | Chordia et al. | |
| 7,306,028 B2 | 12/2007 | Zuo et al. | |
| 2002/0062648 A1 | 5/2002 | Ghoshal | |
| 2004/0211207 A1 | 10/2004 | Forkosh et al. | |
| 2005/0127322 A1 * | 6/2005 | Costello et al. | 252/71 |
| 2006/0230776 A1 | 10/2006 | Inoue et al. | |
| 2006/0266072 A1 | 11/2006 | Takeuchi et al. | |
| 2007/0034354 A1 | 2/2007 | Tung et al. | |
| 2007/0056729 A1 | 3/2007 | Pankratz et al. | |
| 2009/0101308 A1 | 4/2009 | Hardesty | |
| 2009/0223650 A1 | 9/2009 | Williams et al. | |
| 2011/0079022 A1 | 4/2011 | Ma et al. | |

OTHER PUBLICATIONS

NPL—Thermodynamics—Property Tables and Charts, Jul. 2009, pp. 1-6.*
Borgmeyer, B. et al., Experimental Investigation of Oscillating Motions in a Flat Plate Pulsating Heat Pipe, Journal of Thermophysics and Heat Transfer, vol. 21, No. 2, Apr.-Jun. 2007, pp. 405-409.
Cheng, Peng et al., An Investigation of Flat-Plate Oscillating Heat Pipes, ASME Journal of Electronic Packaging, vol. 132, No. 4 041009, Dec. 2010, 20 pgs.
Khandekar, S. et al., Thermofluid Dynamic Study of Flat-Plate Closed-Loop Pulsating Heat Pipes, Microscale Thermophysical Engineering, 6:303-317 (2002), 15 pgs.
Thompson, S. M., et al., Experimental Investigation of Miniature Three-Dimensional Flat-Plate Oscillating Heat Pipe, Journal of Heat Transfer, vol. 131, Apr. 2009, 10 pages.
Boswell, Joe, Project entitled Solar Thermal HVAC System Driven by a High-Efficiency Heat-Pipe Jet Engine, ThermAvant Technologies LLC, 19 pages, 2007.
Supplemental European Search Report for EP 08 85 5297 dated Jan. 3, 2014, 11 pages.

* cited by examiner

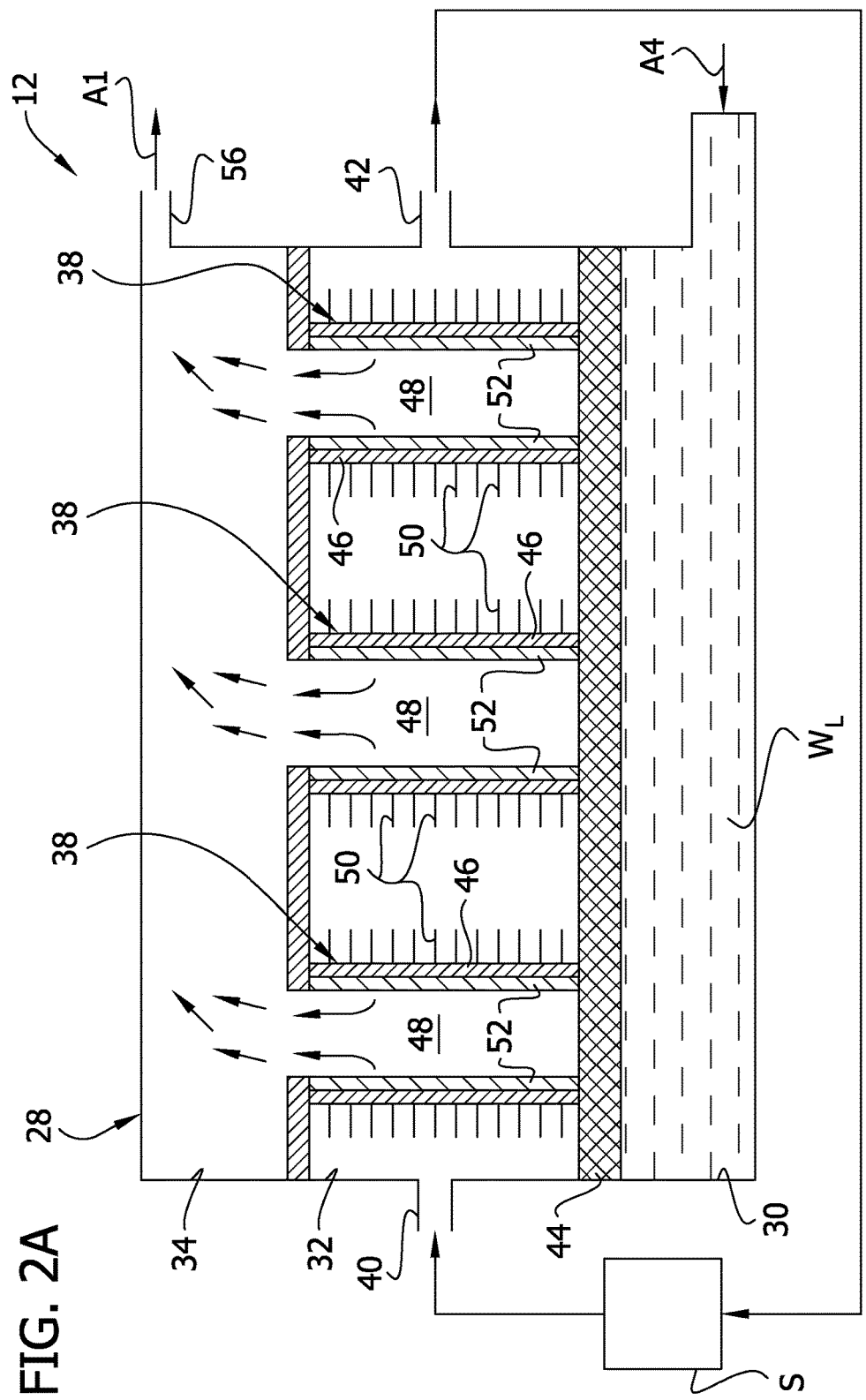

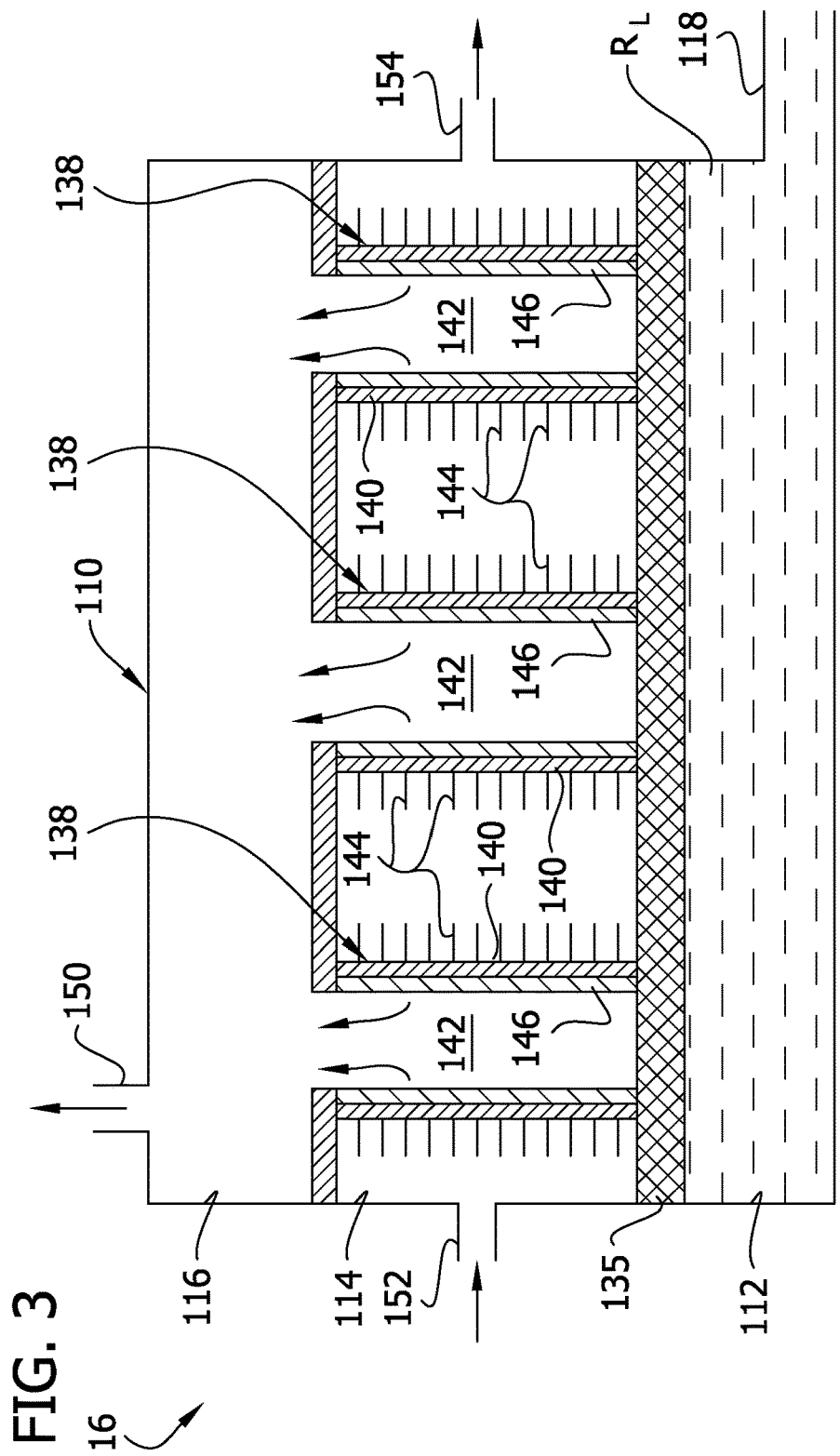

THERMALLY DRIVEN HEAT PUMP FOR HEATING AND COOLING

BACKGROUND

Refrigeration using a high-pressure jet of steam is typically referred to as steam jet cooling. In this method, the cooling system includes a source of steam, an ejector and a closed water vessel fluidly connected to the ejector and containing a refrigerant, usually water. In use, the steam is passed through the ejector to create a partial vacuum in the closed water vessel. Some of the water in the closed vessel vaporizes at the low pressure of the partial vacuum and exhausts into a chamber of the ejector. The vaporized water absorbs heat from the water that remains liquid in the vessel, thereby cooling the liquid water by evaporative cooling. The chilled water is pumped through the system to cool air, and the vaporized water in the ejector is directed to a condenser, where it condenses into liquid and returned to the cooling system. Variations of the aforementioned steam jet system will be known to those of ordinary skill in the art. Systems of this type could also be used for heating.

In order to be commercially practical, an ejector type heat pump needs to have a coefficient of performance (COP) of 1.0-or-greater even when condensing temperatures exceed 100 degrees Fahrenheit. As is known, COP is the ratio of the cooling power to the input power required to achieve the cooling. In an ejector type heat pump the COP is determined by the entrainment ratio (the mass ratio of the refrigerant fluid to working fluid), and the ratio of the enthalpy change of the refrigerant fluid to the enthalpy change of the working fluid. The COP also correlates to the ("lift") ratio of the pressure of the fluid leaving the ejector to the stagnation pressure of the refrigerant entering the ejector. The lift ratio, particularly at high ambient temperatures, requires a high pressure at the exit of the ejector in order for the vapors to reach their saturation pressures and to condense. This requires a substantial amount of heat energy to be supplied to the working fluid, which increases the enthalpy change of the primary fluid and therefore reduces the system's efficiency. In fact, a major disadvantage with the conventional steam jet cooling system is the low coefficient of performance (COP), which is typically about 0.2 to 0.3. One method to improve the COP of an ejector system is to choose a refrigerant fluid (sometimes referred to as the secondary fluid) that is different from the working fluid (sometimes referred to as the primary or driving fluid). Such two-fluid jet cooling systems have achieved COPs of up to 0.5 but have not found commercial acceptance. Another problem with conventional steam jet cooling system is the use of non-environmentally friendly fluids as the working fluid. For example, perfluorocarbon has been used as the primary fluid because of its high molecular weight and immiscibility with common refrigerants such as water, acetone, ammonia, and methanol. However, perfluorocarbons have high global warming potentials. Moreover, typical ejector systems suffer large efficiency losses from the shock that accompanies abrupt transition from supersonic to subsonic flow. Because the losses from a shock are exponentially related to the pre-shock Mach number, a Mach number approaching 1.0 or lower can greatly reduce or even eliminate the shock losses in an ejector system. Still further, kinetic energy losses can occur as the refrigerant vapor is accelerated by the working fluid in the ejector.

SUMMARY

In one aspect of the present invention, a thermally driven heat pump comprising a cooling fluid, a low temperature evaporator for evaporating the cooling fluid to remove heat, and a primary fluid immiscible with the cooling fluid for rapid separation by gravity from the cooling fluid in liquid phase and where primary fluid and cooling fluids have global warming potentials of less than about 1000. A primary fluid evaporator can be used for evaporating the primary fluid by application of heat. An ejector includes a converging/diverging chamber, and nozzle apparatus in fluid communication with the primary fluid evaporator to receive primary fluid vapor and to eject the primary fluid vapor into the converging/diverging chamber at high speed. The low temperature evaporator is in fluid communication with the converging/diverging chamber so that cooling fluid vapor from the low temperature evaporator is aspirated into the converging/diverging chamber. A first heat exchanger located at an outlet of the converging/diverging chamber of the ejector can receive a flow of primary fluid vapor and cooling fluid vapor ejected from the ejector for removing heat from the cooling fluid vapor and primary fluid vapor to facilitate condensation of the cooling fluid vapor and the primary fluid vapor. A separator is in fluid communication with the heat exchanger, the low temperature evaporator and the primary fluid evaporator for use in separating the primary fluid liquid from the cooling fluid liquid, so that cooling fluid can be returned to the low temperature evaporator and the primary fluid can be returned to the high temperature evaporator. A return conduit containing primary fluid is connected to the separator and to the primary fluid evaporator for returning primary fluid to the primary fluid evaporator.

In another aspect, an ejector for use in a thermally driven heat pump that includes an evaporator for evaporating a cooling fluid generally comprises a converging/diverging chamber having centerline and an inlet adapted for connection to the evaporator of the thermally driven heat pump for aspirating vaporized cooling fluid from the evaporator. A nozzle apparatus is located for ejecting a high speed vapor flow of a primary fluid into the converging/diverging chamber. A control controls the nozzle apparatus to at least one of oscillate and nutate the flow from the nozzle apparatus generally laterally of the chamber centerline.

In a further aspect of the present invention, an ejector for use in a thermally driven heat pump including an evaporator for evaporating a cooling fluid generally comprises a converging/diverging chamber having an inlet adapted for connection to the evaporator of the thermally driven heat pump for aspirating vaporized cooling fluid from the evaporator. A nozzle apparatus is located for ejecting a high speed vapor flow of a primary fluid into the converging/diverging chamber. The converging/diverging chamber includes a rotary mixing section downstream from the nozzle apparatus adapted to mix primary fluid with the aspirated cooling fluid.

In yet another aspect, an ejector heat pump system generally comprises a low temperature evaporator for evaporating a cooling fluid to remove heat, and a primary fluid evaporator for evaporating primary fluid by application of heat. A first ejector includes a converging/diverging chamber and nozzle apparatus in fluid communication with the primary fluid evaporator to receive primary fluid vapor and to eject the primary fluid vapor into the converging/diverging chamber at high speed. The low temperature evaporator is in fluid communication with the converging/diverging chamber so that cooling fluid vapor from the low temperature evaporator is aspirated into the converging/diverging chamber. A first heat exchanger is located at an outlet of the converging/diverging chamber of the first ejector for receiving a flow of primary fluid vapor and cooling fluid vapor ejected from the first ejector for condensing a portion of at least one of the cooling fluid vapor and primary fluid vapor. A second ejector includes a converging/diverging chamber and a nozzle apparatus adapted to eject a fluid into the converging/diverging chamber at high speed. The first heat exchanger is in fluid communication with the converging/diverging chamber of the second ejector so that cooling fluid vapor and primary fluid vapor in the first heat exchanger are aspirated into the converging/diverging chamber. A second heat exchanger is located at an outlet of the converging/diverging chamber of the second ejector for receiving primary fluid vapor and cooling fluid vapor ejected from the second ejector for condensing the cooling fluid vapor and the primary fluid vapor. A separator is in fluid communication with the second ejector, the low temperature evaporator and the primary fluid evaporator for use in separating the primary fluid from the cooling fluid to be returned to the low temperature evaporator and primary fluid evaporator, respectively.

In another aspect, a heat pipe jet engine generally comprises a high velocity nozzle apparatus, and a fluid evaporator fluidly connected upstream to the nozzle apparatus. The evaporator includes at least one heat pipe having wicking structure disposed on an interior surface of the pipe for use in thin film evaporation of fluid from an evaporator.

In yet another aspect, a method of cooling generally comprises heating a primary fluid to vaporize the primary fluid, and passing the vaporized primary fluid through a nozzle of a first ejector into a high speed flow producing a vacuum pressure adjacent to the flow. A cooling fluid vapor is aspirated from an evaporator by the vacuum pressure produced by the nozzle. The primary fluid is ejected and cooling fluid is entrained into a first heat exchanger. At least one of the cooling fluid vapor and primary fluid vapor is partially condensed in the first heat exchanger. The cooling fluid vapor and primary fluid vapor are aspirated from the first heat exchanger with a second ejector. The cooling fluid vapor and primary fluid vapor are ejected from the second ejector into a second heat exchanger. The primary fluid vapor and cooling fluid vapor are condensed in the second heat exchanger.

In another aspect, a thermally driven heat pump generally comprises a low temperature evaporator for evaporating a cooling fluid to remove heat, and a primary fluid evaporator for evaporating primary fluid by application of heat. An ejector includes a converging/diverging chamber and nozzle apparatus in fluid communication with the primary fluid evaporator to receive primary fluid vapor and to eject the primary fluid vapor into the converging/diverging chamber at high speed. The low temperature evaporator is in fluid communication with the converging/diverging chamber so that cooling fluid vapor from the low temperature evaporator is aspirated into the converging/diverging chamber. A heat exchanger located at an outlet of the converging/diverging chamber of the ejector receives a flow of primary fluid vapor and cooling fluid vapor ejected from the ejector for condensing a portion of at least one of the cooling fluid vapor and primary fluid vapor. An absorption apparatus includes an absorber located in the heat exchanger for absorbing cooling fluid vapor into an absorbing fluid thereby to reduce the pressure in the heat exchanger. A generator separates the cooling fluid from the absorbing fluid. A separator is in fluid communication with the ejector, the low temperature evaporator and the primary fluid evaporator for use in separating the primary fluid from the cooling fluid to be returned to the low temperature evaporator and primary fluid evaporator, respectively.

BRIEF DESCRIPTION OF THE DRAWINGS

FIG. 2A is a schematic of one embodiment of a first working fluid evaporator of the thermally driven heat pump;

FIG. 3 is a schematic of one embodiment of a second working fluid evaporator of thermally driven heat pump;

Corresponding reference characters indicate corresponding parts throughout the drawings.

DETAILED DESCRIPTION OF THE DRAWINGS

Figure 1:
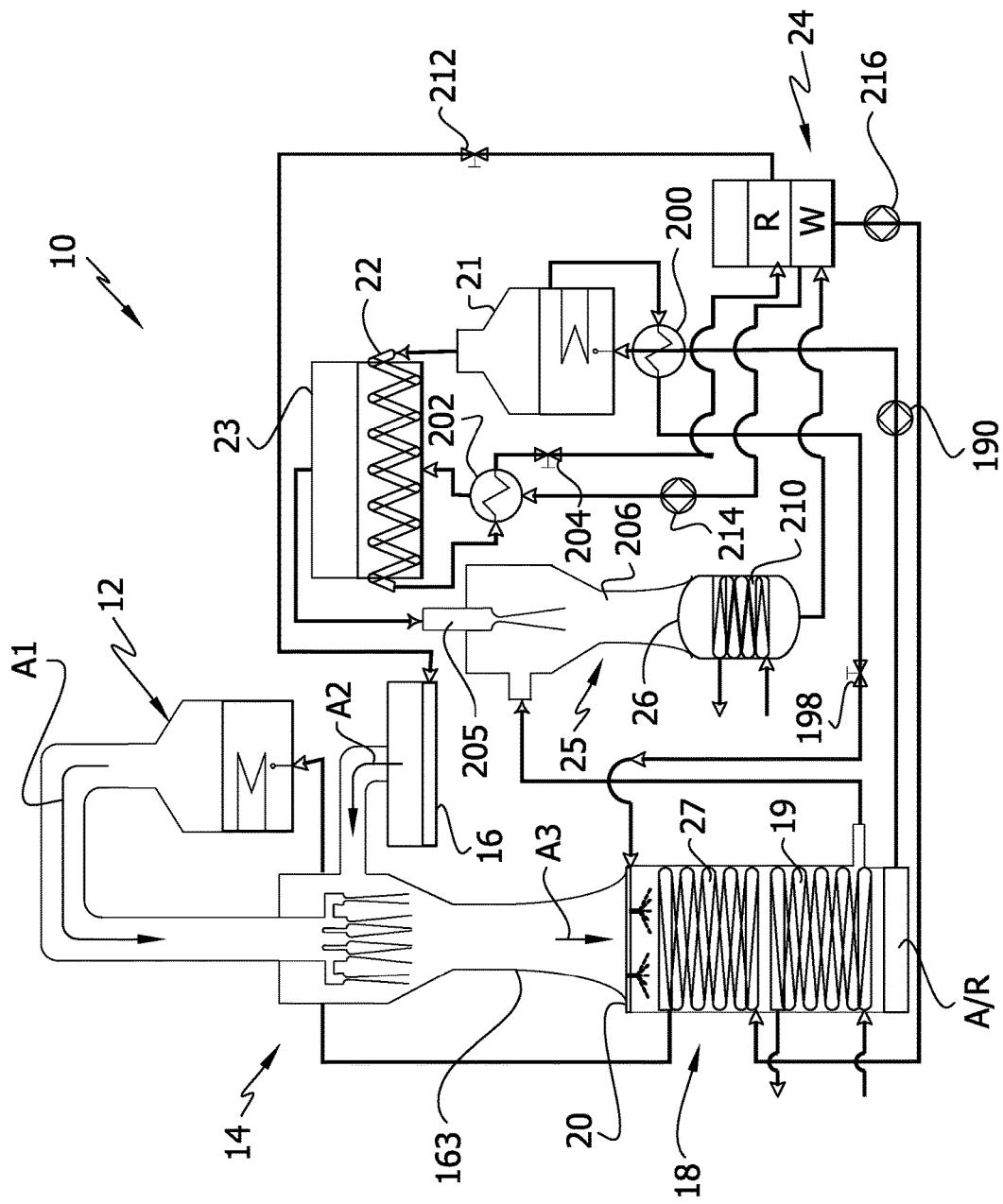
FIG. 1 is a schematic of a first embodiment of a thermally driven heat pump.

Referring now to the drawings, and in particular to FIG. 1, a first embodiment of a thermally driven heat pump is generally indicated at 10. In use, a first primary or working fluid evaporator 12 supplies a first ejector, generally indicated at 14, with high pressure, vaporized motive or working fluid (broadly, a primary fluid) as indicated by arrow A1. The first ejector 14 draws vaporized refrigerant fluid (broadly, a secondary or cooling fluid) from a low temperature evaporator 16 (referred to herein as "LTE"; broadly, a second evaporator) into the ejector, as indicated by arrow A2, where it mixes with the working fluid. An initial heat exchanger, generally indicated at 18, receives the vaporized working-refrigerant fluid mixture from an outlet of the first ejector 14 (indicated at arrow A3). Coolant, such as water or a glycol-water mixture is circulated through a first coil 19 (broadly, a conduit) of the initial heat exchanger 18. An absorber 20 supplies an absorbent in the initial heat exchanger 18. Instead of or in addition to the first coil 19, ambient air may be blown over the heat exchanger 18 to remove heat. The absorbent absorbs some of the vaporized refrigerant fluid of the vaporized working-refrigerant fluid mixture exiting the first ejector 14. The absorbent and the vaporized refrigerant fluid absorbed by the absorbent are collected in the initial heat exchanger 18, as indicated by A/R. This absorbent/refrigerant is delivered (e.g., pumped) to a generator 21, where the refrigerant is vaporized to separate the refrigerant from the absorbent. From the generator 21, the liquid absorbent is pumped back to the absorber 20 in the initial heat exchanger 18, and the vaporized refrigerant is delivered into a coil 22 (broadly, a conduit) of a second working fluid evaporator 23. The heat of the vaporized refrigerant in the coil 22 vaporizes the working fluid in the second working fluid evaporator 23, for purposes explained below, and the vaporized refrigerant condenses in the coil 22 and is delivered to a low temperature collector or separator, generally indicated at 24. The separator 24 includes separated layers of liquid refrigerant and liquid working fluid. From the separator 24, the working fluid is delivered to the second working fluid evaporator 23, where the working fluid is vaporized, as explained above. The vaporized working fluid flows through a second ejector, generally indicated at 25, to draw the remainder of the vaporized mixture of working fluid and refrigerant in the initial heat exchanger 18 into the second ejector. A secondary heat exchanger 26, which functions as a condenser, is fluidly connected to an outlet of the second ejector 25 and condenses the entrained mixture of refrigerant and working fluid from the second ejector. From the secondary heat exchanger 26, the condensed mixture of refrigerant and working fluid flows to the separator 24. The condensed refrigerant in the separator 24 is delivered to the low temperature evaporator 16, while the condensed working fluid in the separator is delivered through a second coil 27 (broadly, a second conduit) in the initial heat exchanger 18 to absorb heat from the vaporized working-refrigerant fluid mixture before the working fluid is delivered to the first working fluid evaporator 12.

As will become apparent throughout this discussion of the embodiments of the invention, the working fluid desirably has a latent heat of vaporization that is much less than the latent heat of vaporization of the refrigerant so that the working fluid vaporizes with a relatively small heat input. In one embodiment, the ratio of the heat of vaporization of the refrigerant to the heat of vaporization of the working fluid is at least about 2.0. Although the illustrated embodiments are concerned with refrigeration, it will be understood that the thermally driven heat pump of the present invention has other applications. For instance, the heat pump may be used to heat, rather than cool a space. Still further, the heat pump may have application to other apparatus not specifically purposed for the movement of heat. For example, evaporation produced by this apparatus could be used of desalinization or other useful processes.

As will be understood, the optimal design of the heat pump 10 is dependent on the amount of desired cooling to be obtained by the system at the low temperature evaporator 16. For purposes of the below discussion, the desired results and functions of the various components and aspects of the heat pump will be discussed with the understanding that the parameters of such components and aspects are dependent on variables such as, but not limited to, the desired amount of cooling, the desired amount of work put into the heat pump at the working fluid evaporators, the thermal characteristics of the desired working fluid and the desired refrigerant fluid, and the desired design of the ejector.

Figure 2B:
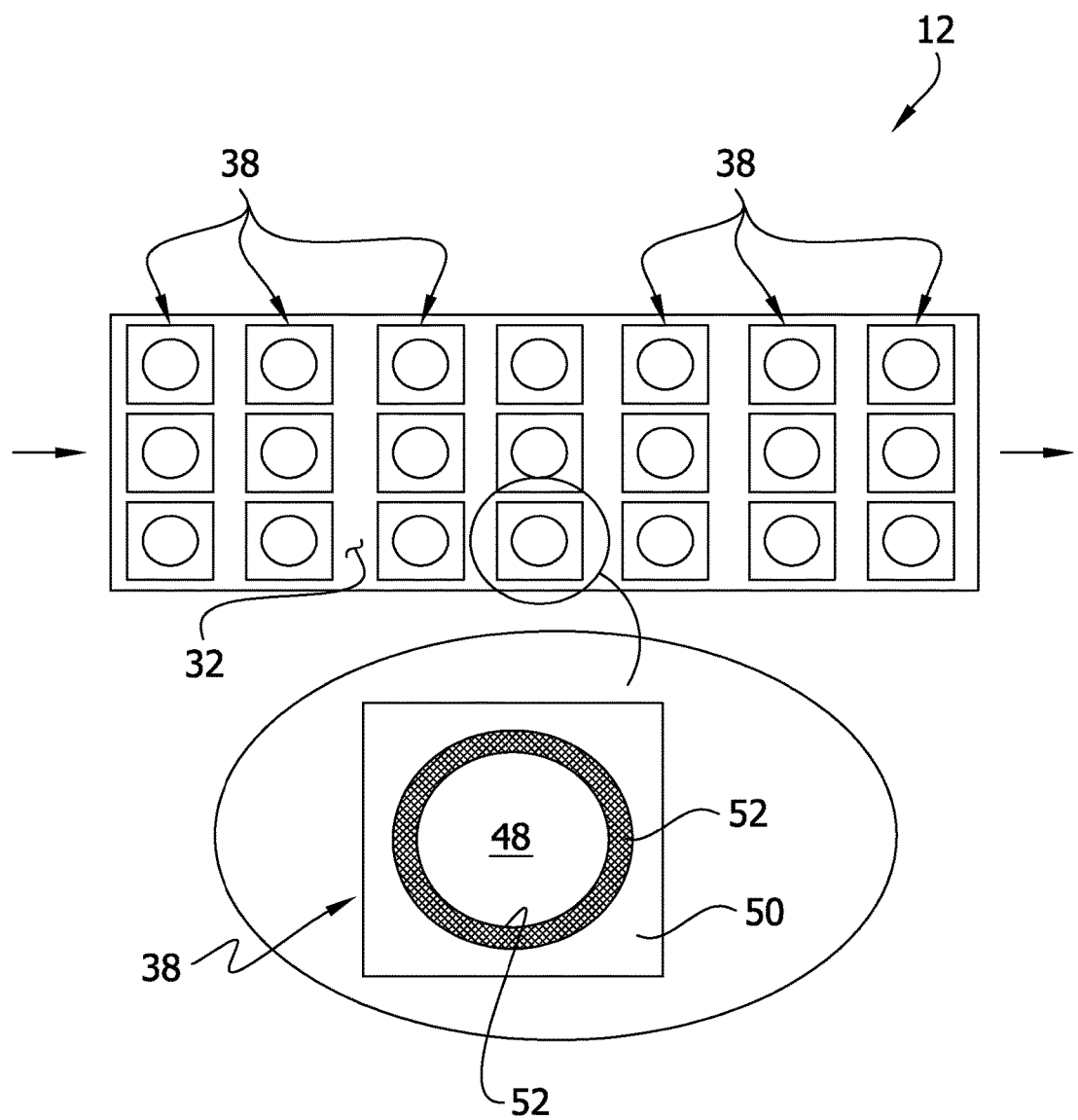
FIG. 2B is a top view schematic of the first working fluid evaporator.

The first working fluid evaporator 12 of this embodiment utilizes hot water from an external source to heat the working fluid in the first working fluid evaporator 12. It is understood that the heat source may be other than hot water, such as a gas-driven heater or biomass-driven heater, or a solar energy collector or process waste heat source. Other ways of providing heat to the first working fluid evaporator 12 do not depart from the scope of the present invention. The temperature of the hot water from the external source is generally maintained at a temperature of at least about 75° C., and preferably about 120° C., to maintain relatively high vapor pressure in the first working fluid evaporator 12. As shown in FIGS. 2A and 2B, the first working fluid evaporator 12 of the illustrated embodiment comprises an enclosed chamber 28 having a lower liquid reservoir compartment 30, a heat transfer compartment 32 disposed above the reservoir chamber and a vapor compartment 34 disposed above the heat transfer compartment. The heat transfer compartment 32 is sealed from fluid communication with the liquid reservoir compartment 30 and vapor compartment 34. The liquid reservoir compartment 30 is fluidly connected to both the initial heat exchanger 18 and the separator 24 for receiving recycled working fluid condensate, indicated at arrow A4. The vapor compartment 34 is fluidly connected to the ejector 14 for delivering working fluid vapor, as indicated by arrow A1. A plurality of heat pipes, each generally indicated at 38, disposed within the heat transfer compartment 32 have lower open ends in fluid communication with the liquid reservoir compartment 30 and upper open ends in fluid communication with the vapor compartment 34. The respective ends of the heat pipes 38 are not in fluid communication with the heat transfer compartment 32. The heat transfer compartment includes an inlet 40 for receiving the hot water, or other fluid, and an outlet 42 for removing the water from the compartment. The water may be heated by a suitable source of energy, such as solar, electricity, natural gas or other means at the source S. The source S may also use waste heat generated in a separate process. As explained in more detail below when describing the heat pipes 38, heat from the hot water is absorbed by the liquid working fluid $W_L$ in the heat pipes to vaporize the working fluid.

The first working fluid evaporator 12 further includes a wick 44 generally between the liquid reservoir compartment 30 and the heat pipes 38. The wick 44 is made of a porous material such as a bundle copper wire filaments (similar to steel wool) that draw liquid from the liquid reservoir compartment by capillary action upward to the heat pipes 38. The illustrated first working fluid evaporator 12 comprises an array twenty-one heat pipes 38 having generally identical structures. It will be understood that other numbers and configurations of heat pipes may be used within the scope of the present invention. Each heat pump 38 includes a tubular body 46 having an axial length extending between the open ends of the pump. The tubular body 46 has an exterior surface and an interior surface defining an axial passage 48. A plurality of heat fins 50 disposed along the length of the tubular body 46 extend outward from the exterior surface of the tubular body, generally transverse to the longitudinal axis of the body. Microgrooves 52 or other microwicks are disposed on the interior surface of the tubular body 46. The microgrooves 52 draw liquid working fluid $W_L$ from the wick 44 into a thin film on the wall of the tubular bodies 46 of the heat pipes 38.

Heat is transferred from the hot water or other fluid flowing through the heat transfer compartment 32 to the fins 50 and tubular bodies 46 of the heat pipes 38 and the heat is further transferred to the liquid working fluid $W_L$ in the microgrooves 52 in the heat pipes to produce an efficient, thin film evaporation of the liquid working fluid $W_L$ inside the heat pipes 38. The thin film evaporation of the working fluid produces a high heat transfer coefficient resulting in high vapor pressure at a vapor outlet 56, which is fluidly connected to the ejector 14. This high vapor pressure is necessary to produce a high velocity flow rate in the ejector, as will be explained below. It will be understood that the amount of vapor pressure for a given input depends upon the type of working fluid.

The thin film evaporation of the working fluid in the heat pipes 38 of the first working fluid evaporator 12 is highly efficient. Therefore, the temperature of the hot water in the heat transfer compartment 32 need be only slightly higher than the boiling point of the working fluid $W_L$. For example, the temperature of the water may need to be only 1° C. warmer than the boiling temperature of the working fluid $W_L$ the low latent heat of the working fluid in combination with the efficiency of thin film evaporation in the heat pipes 38 gives the cooling system 10 a good coefficient of performance (COP). It is believed the COP of the cooling system 8 is between 1 and 2. In one example where the working fluid $W_L$ NOVEC™ HFE7300, available from the 3M Company of St. Paul Minn.), the working liquid can be evaporated at about 120° C. to produce approximately 24.82 psi (about 171 kPa) of vapor pressure in the vapor compartment 34. In the same example, the refrigerant can be water. Other fluid pairs are permissible, but preferably the working fluid and refrigerant are environmentally friendly fluids with low global warming potential and low ozone depletion potential. Moreover, the working fluid and refrigerant are preferably immiscible.

Not only may the working fluid have a relatively high molecular weight, a relatively low latent heat, and be immiscible with the refrigerant fluid, it may also have a low Global Warming Potential (GWP) compared to current refrigerants and working fluids. GWP is a measure of how much a given mass of greenhouse gas is estimated to contribute to global warming. It is a relative scale which compares the gas in question to that of the same mass of carbon dioxide (whose GWP is by definition 1). A GWP is calculated over a specific time interval, and a smaller GWP is preferable. For the purposes of this disclosure the timescale is 100 years. Common refrigerants in vapor compression cycle cooling (VCC) and refrigeration systems such as HFC-23 (a hydrofluorocarbon) have high GWPs (14,800 for HFC-23) while others being used in VCC systems such as HFC-134a (a hydrofluorocarbon) have lower GWPs (1,430 for HFC-134a). Organic refrigerants such as water and ammonia have GWPs of 0 and are therefore highly preferable for reduction of greenhouse gas emissions related to refrigerant leakage. Prior two-fluid ejector or jet cooling systems proposed using perfluorocarbons such as FC-75 as marketed by the 3M Company. FC-75 and other perfluorocarbons have GWPs of 7,000-plus. In one embodiment, the working fluid for use in the thermally-driven heat pump will have a low GWP of approximately 1,000 or lower, and more preferably, 500 or lower. One example of such a working fluid is the aforementioned NOVEC™HFE7300 (having a GWP of about 200) which can be paired with a refrigerant such as water to form a low GWP heat pump system.

Figure 2C:
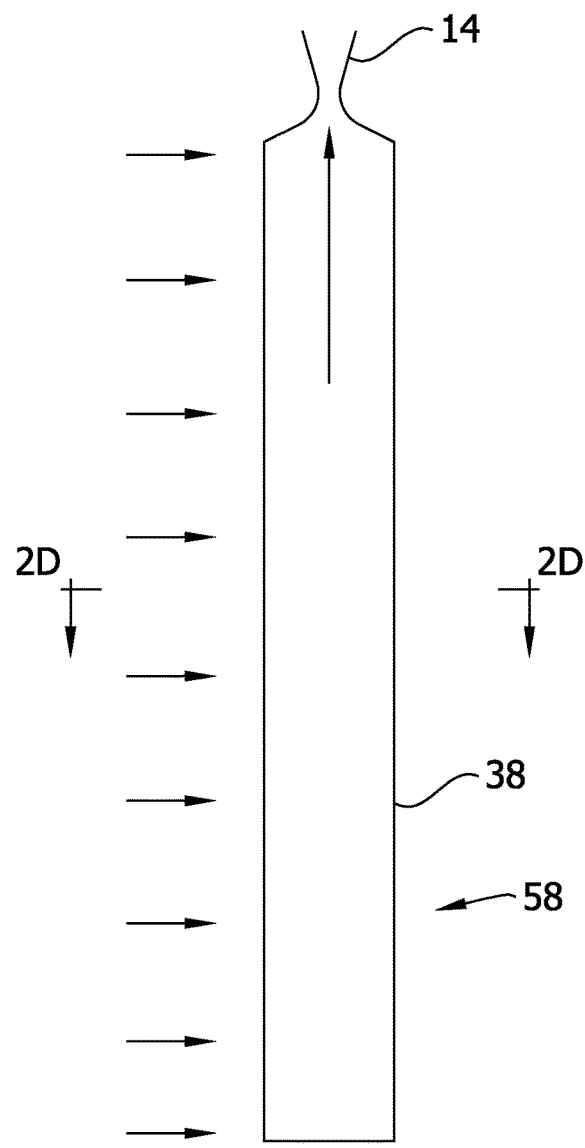
FIG. 2C is a schematic of another embodiment of the first working fluid evaporator.
Figure 2D:
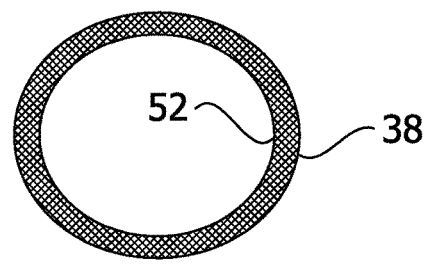
FIG. 2D is a section of the first fluid evaporator of FIG. 2C taken along the line 2D-2D.

It is understood that heat for operating the system may be provided in other ways besides hot water. For example, in another embodiment illustrated schematically in FIGS. 2C and 2D, a working fluid evaporator, indicated generally at 58, is configured to vaporize the working fluid using solar energy. The working fluid evaporator 58 of this embodiment includes a single heat pump 38 having microgrooves 52 or other microwicks on its interior surface similar to the heat pipes in FIG. 2A. The heat pump 38 is able to absorb solar energy directly and transfer the absorbed solar energy to the working fluid in the microgrooves 52 to produce thin film evaporation. Other ways of supplying energy to the heat pump 10 are within the scope of the present invention.

Referring to FIG. 3, the illustrated low temperature evaporator 16 is similar in structure to the illustrated first working fluid evaporator 12 in FIG. 2A. The low temperature evaporator 16 comprises an enclosed chamber, indicated generally at 110, having a lower condensate reservoir compartment 112, a heat transfer compartment 114 disposed above the reservoir compartment and a vapor compartment 116 disposed above the heat transfer compartment. The reservoir compartment 112 includes an inlet port 118 fluidly connected to separator 24.

Referring still to FIG. 3, a plurality of heat pipes, generally indicated at 138, are disposed within the heat transfer compartment 114. The heat pipes 138 are similar to the heat pipes 38 of the first working fluid evaporator 12 in that each pipe includes a tubular body 140 having an axial length extending between the open ends of the pump. The tubular body 140 has an exterior surface and an interior surface defining an axial passage 142. A plurality of heat fins 144 disposed along the length of the tubular body 140 extend outward from the exterior surface of the tubular body, generally transverse to a longitudinal axis of the body. Microgrooves 146 or other microwicks are disposed on the interior surface of the tubular body 140. Each tubular body 140 has a lower open end in fluid communication with the liquid reservoir 112 and an upper open end in fluid communication with the vapor compartment 116. The ends of the heat pipes are not in fluid communication with the heat transfer compartment 114, which is sealed from both the reservoir compartment 112 and the vapor compartment 116. A wicking layer 135 delivers condensate refrigerant fluid RL from the reservoir 112 to microgrooves 146 of the heat pipes 138. The wicking layer 135 may be formed in the same way as the wick 44 of the first working fluid evaporator 12.

The vapor compartment 116 includes a vapor outlet 150 fluidly connected to a refrigerant vapor inlet 166 (FIG. 4) of the first ejector 14. As will be explained below, a low pressure created in the first ejector 14 produces low pressure in the low temperature evaporator 16, more specifically, the vapor compartment 116, so that the refrigerant condensate RL within the low temperature evaporator vaporizes within the heat pipes 138 at a lower temperature and the refrigerant vapor is drawn into the ejector. External fluid, such as air or water within a household or building, flows (e.g., is pumped) into the heat transfer compartment 114 via an inlet 152 where it is cooled when the refrigerate condensate RL vaporizes. In other words, when the refrigerate condensate vaporizes in the heat pipes 138, heat is absorbed from the fluid flowing through the heat transfer compartment 114. The amount of heat absorbed depends at least in part upon the latent heat of the refrigerant and the mass flow of vaporized refrigerant. The external fluid flows out of the heat transfer compartment 114 through an outlet 154, where the fluid (e.g., air) may enter duct work, for example, to cool the household or building.

The use of thin film evaporation of the refrigerant condensate in the heat pipes 138 of the low temperature evaporator 16 to absorb heat from the environment increases the cooling capacity of the cooling system because the thin film evaporation can significantly reduce the thermal resistance (i.e., the evaporating heat transfer coefficient can be significantly increased), which can effectively cool the chilled water or air for household, building or other suitable use.

The second working fluid evaporator 23 may have essentially the same construction as the first working fluid evaporator 12. In particular, the second working fluid evaporator 23 may take advantage of thin film evaporation, as described for the first working fluid evaporator 12. The coil 22 represents the heat transfer to the working fluid in the second working fluid evaporator. The actual arrangement can be similar what is shown in FIG. 2A for the first working fluid evaporator in regard to fluid from the source S flowing over the heat pipes 38. It will be appreciated that the second working fluid evaporator may have other configurations (not shown), including configurations which differ from the first working fluid evaporator.

Figure 4:
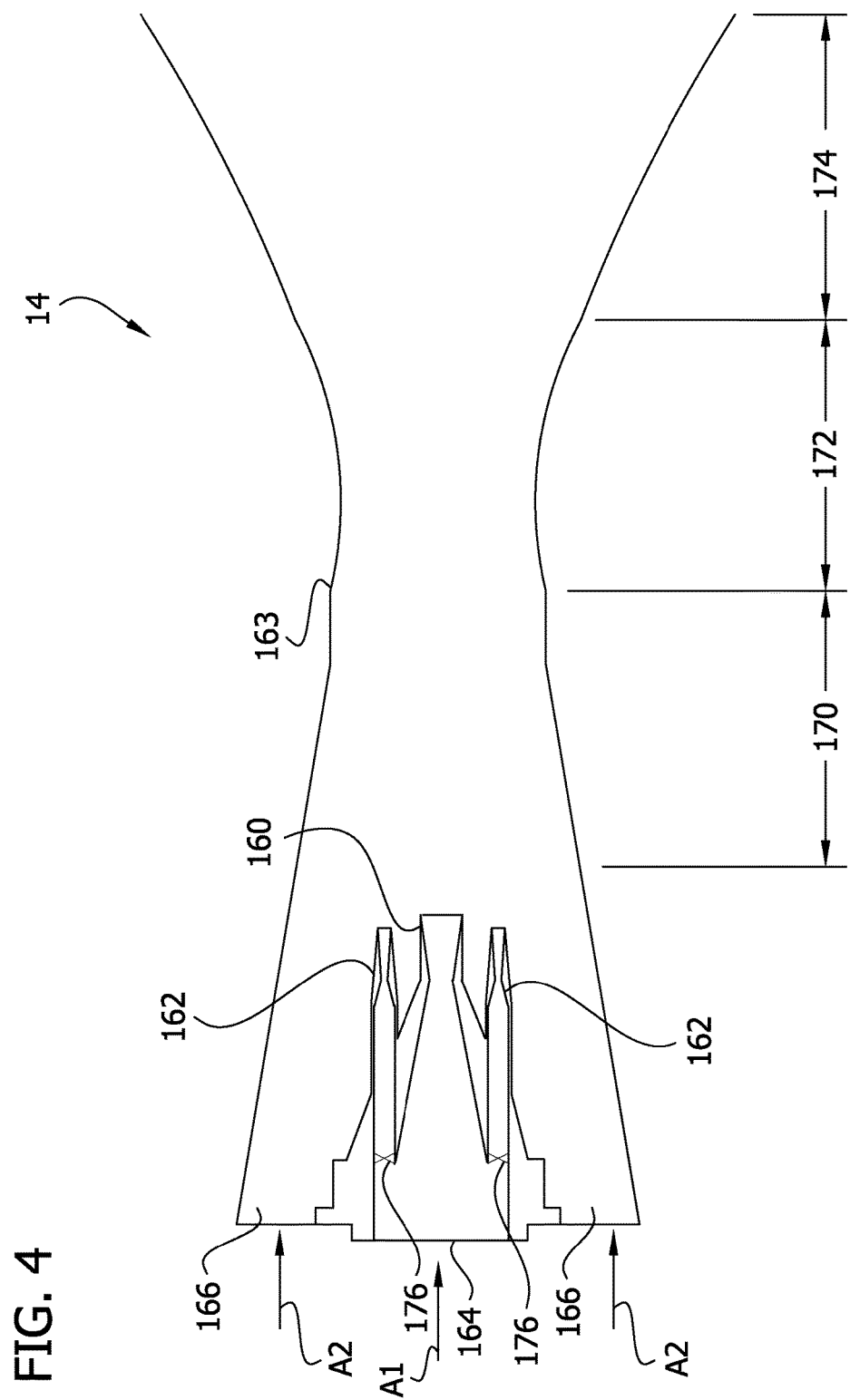
FIG. 4 is a schematic of one embodiment of a first ejector.

Referring now to FIG. 4, in the illustrated embodiment the first ejector 14 includes a converging-diverging primary nozzle 160, converging-diverging auxiliary or fluid control nozzles 162, and a converging-diverging chamber 163. The primary nozzle 160 and the fluid control nozzles 162 are in fluid communication with the high pressure vapor flow in the vapor compartment 34 of the first working fluid evaporator via a shared working fluid inlet 164 at an inlet end of the first ejector 14. The first ejector 14 also includes the refrigerant vapor inlet 166 at the first end of the ejector. The refrigerant vapor inlet 166 is fluidly connected to the low temperature evaporator 16 for receiving vaporized refrigerant fluid, as indicated by arrows A2. The angle the flow of refrigerant fluid makes with a centerline of the first ejector 14 is preferably less than about 45° and more preferably less than about 15°. Because the angle of entry of the refrigerant is close to parallel with the direction of flow of the working fluid exiting the main nozzle 160, kinetic energy losses associated with changing the direction of flow of the refrigerant are significantly reduced. Downstream of the nozzles 160, 162 in the converging/diverging chamber 163 is a mixing section 170, and downstream of the mixing section is an intermediate section 172 and a diffuser section 174. In general, the ejector 14 operates under the Venturi effect. The vaporized working fluid from the first working fluid evaporator 12 enters the nozzles 160, 162 under high pressure (e.g., about 172 kPa) and exits the nozzles as a high velocity jet, thus creating a low pressure at the outlets of the nozzles corresponding to the location of the mixing section 170. The vaporized refrigerant fluid in the low temperature evaporator 16 is drawn into the mixing section 170 the chamber 163 via the refrigerant vapor inlet 166, and the refrigerant vapor is entrained with the vapor working fluid jet.

Figure 5A:
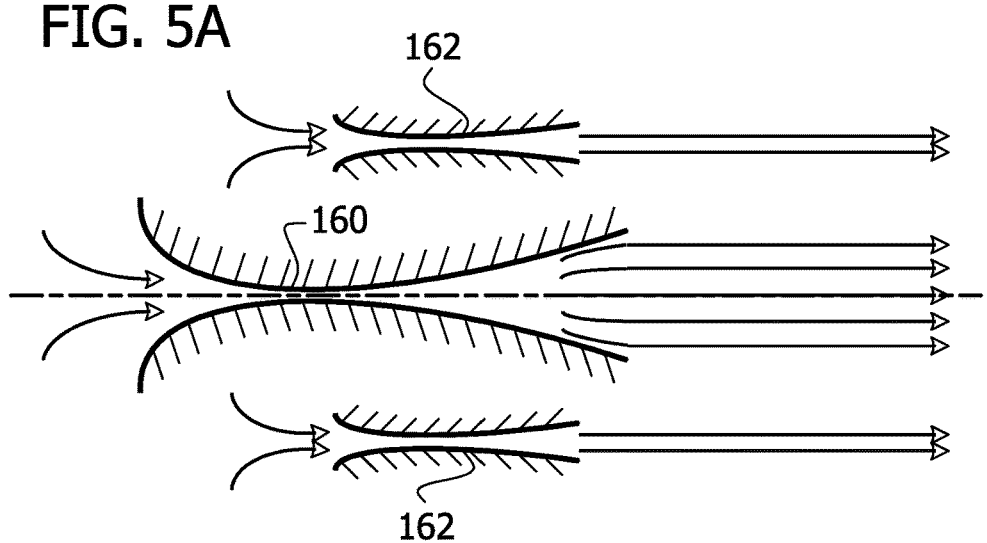
FIG. 5A is a schematic of the ejector illustrating flow with two flow control nozzles open.
Figure 5B:
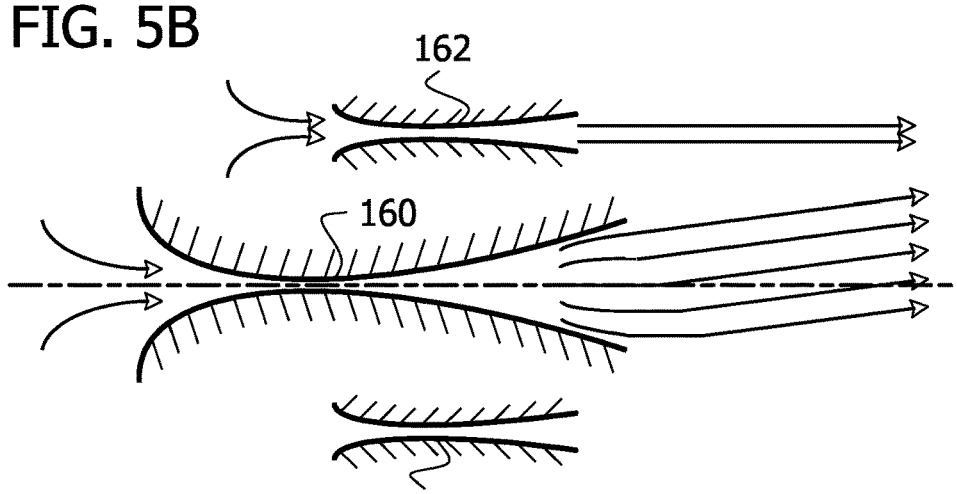
FIG. 5B is a schematic of the ejector similar to FIG. 5A except that one of the flow control nozzles is closed.
Figure 5C:
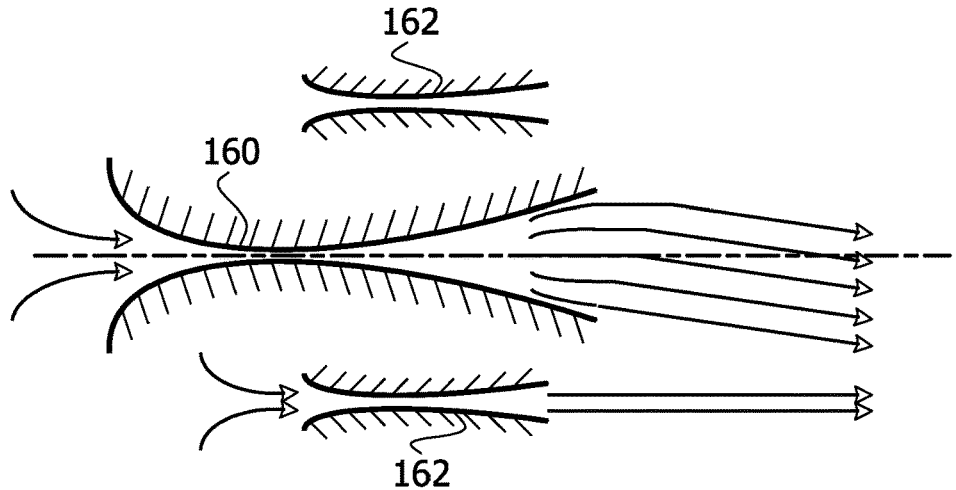
FIG. 5C is a schematic of the ejector similar to FIG. 5B except that the closed nozzle is open and the other of the flow control nozzles is closed.

One of the key measures of an ejector system's efficiency is its entrainment ratio, which is the ratio of secondary mass flow (e.g., refrigerant fluid) to the primary fluid's mass flow (e.g., working fluid). Two key determining parameters of entrainment ratio are: a) the pre-mixing contact area ratio of the two fluids inside the mixing chamber, and b) the primary fluid's Mach number at nozzle outlet. In the illustrated embodiment, the control nozzles 162 facilitate mixing of the working and refrigerant fluids more uniformly and with a larger contact area ratio than with a single primary nozzle. The sizes of control nozzles 162 are relatively smaller than the primary nozzle 160, and each control nozzle includes a valve 176 that can be controlled to open and close. Referring to FIG. 5A, when both valves 176 of the control nozzles 162 are open, the fluid field of the primary flow is unchanged. It will be understood that the primary flow would also be unaffected if valves 176 were closed. Referring to FIGS. 5B and 5C, when one of the valves 176 is closed and the other valve is open so that fluid is flowing through the open control nozzle, a low pressure is created at the open nozzle and fluid flowing from the primary nozzle 160 is directed toward the fluid flow from the control nozzle 162. By alternating the valves 176 between on and off positions, a back and forth oscillating or nutating flow of the primary flow is produced, which can increase the pre-mixing contact area of the working fluid and the refrigerant fluid. It will be understood that there may be more than the two control nozzles 162 illustrated. To produce nutation of the flow jet from the primary nozzle 160, additional control nozzles 162 are located around the primary nozzle. The oscillation or nutation is generally with respect to a centerline of the ejector which corresponds to the direction of flow of the primary fluid from the primary nozzle 160 when not affected by the control nozzles 162. For example in operation, the flow from the main nozzle 160 may sweep out a cone shape. This increase in pre-mixing contact area ratio allows for a higher entrainment ratio of the ejector 14 and increases the COP of the entire system. The control nozzles 162 also allow for more complete mixing in a shorter axial distance and therefore allow for the ejector 14 to be more compact in size.

After complete mixing within the mixing section 170, the supersonic mixed vapor has a molecular weight that is based on the mol fractions of the two immiscible working and refrigerant vapors being mixed and their respective molecular weights. For example, the ratio of the molecular weight of the working fluid to the molecular weight of the refrigerant may be least about 5.0. Because the refrigerant fluid has a substantially lower molecular weight than the working fluid, the mixed vapor stream has a resulting molecular weight that is lower than that of the working fluid flow prior to mixing. The mixed flow's lower molecular weight means it has a higher local speed of sound, and therefore a lower Mach number than the working fluid flow had prior to mixing. The intermediate section 172 has a shape corresponding to a constant rate of momentum change (CRMC) curve that helps to minimize shock losses as the flow mixture enters the diffuser 174 from the intermediate section 172. The intermediate section 172 has converging section, a diverging section and a minimum radius between the sections. The vapor mixture reduces speed to its local speed of sound (i.e., about Mach 1) or lower as it enters the minimum radius of the intermediate section 172. The flow then enters the diverging section without an abrupt transition from a highly supersonic to subsonic flow and without the resulting shock losses from such a transition. The shock losses of prior ejectors, without an intermediate section 172 having the constant rate of momentum change curve, have resulted in a lower total stagnation pressure at end of the diffuser section 174. In prior multi-fluid systems where sonic choking can be avoided if the secondary fluid has a much lower molecular weight than the primary fluid, the fluid field has not been controlled to align the secondary flow's velocity gradient with that of the primary flow in order to minimize the velocity differences of the two fluids, and therefore minimize the kinetic energy losses incurred during the mixing process. The total practical effect of the fluid control method, the shock loss mitigation, and the kinetic energy loss minimization is to reduce the size and increase the efficiency of the ejector system used in the illustrated embodiment.

Figure 6A:
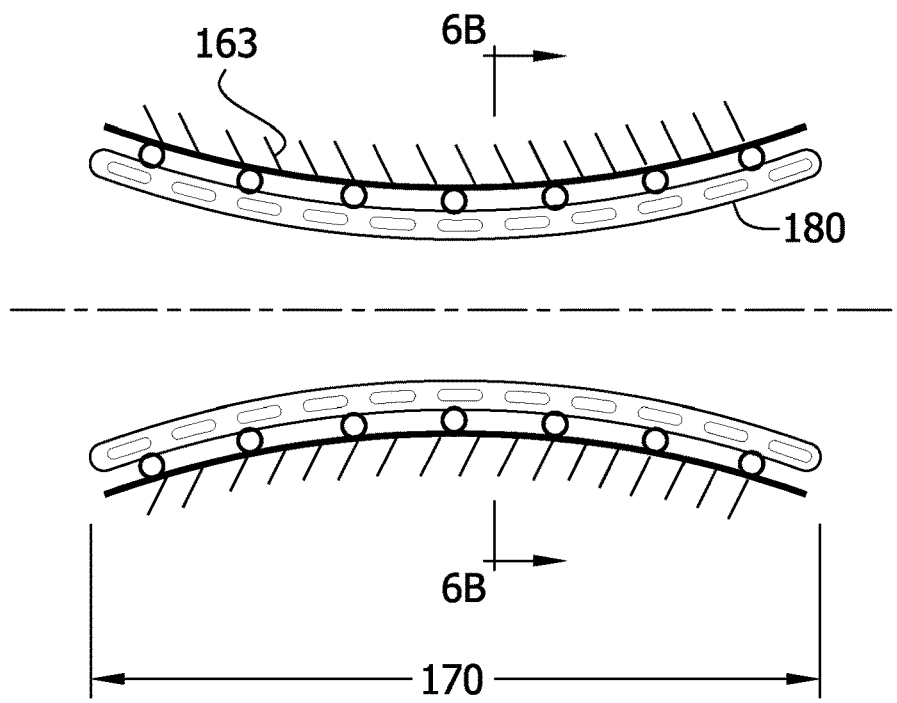
FIG. 6A is a schematic of one embodiment of a mixing section of a converging-diverging chamber of the ejector.
Figure 6B:
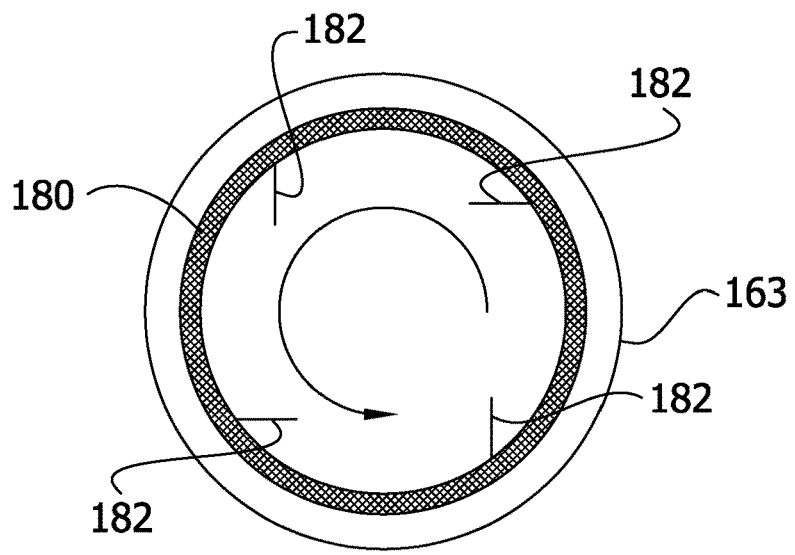
FIG. 6B is a section taken along the line 6B-6B in FIG. 6A.

Another way of mixing the working fluid and refrigerant is schematically illustrated in FIGS. 6A and 6B. In this configuration, the mixing section 170 may include a rotating cylinder 180 with fins 182. The rotating cylinder 180 is preferably mounted on very low friction bearings, minimizing friction losses. The fins 182 can have a shape, which can transform the momentum of the working fluid into a mechanical work, i.e., using a part of momentum from the working fluid to make the cylinder 180 rotate. The shapes of the fins 182 can be optimized for various conditions by experimental investigation and mathematical modeling. As the working fluid flows through the cylinder 180 with fins 182, the momentum of the working fluid will make the cylinder rotate. As a result, the rotating of the cylinder 180 with fins 182 will effectively mix the working fluid and refrigerant fluid and increase the effective contact area of the working and refrigerant fluids and further increase the entrainment ratio of the refrigerant fluid. It will be understood that the rotating cylinder 180 can be used instead of or in addition to oscillating or nutating the flow of primary fluid from the primary nozzle 160 with the control nozzles 162 to mix working fluid flow and refrigerant fluid flow.

Referring to FIG. 1, the vapor mixture of working/refrigerant fluid comes into the initial heat exchanger 18 from the outlet of the first ejector 14 with a total pressure that is determined by the mol fraction of the working and refrigerant fluids, their respective initial pressures, temperatures and thermodynamic properties, the Mach number of the working fluid leaving the nozzles 160, 162, and the fluid control methods within the ejector 14 to maximize the mixing area and to minimize kinetic energy and shock losses. The total pressure from the first ejector 14 however, is limited by the known parameters of an ideal turbine-compressor which will be known to those versed in the art. In order to condense the mixed vapors from the first ejector 14, the total pressure exiting the first ejector must be at least as great as the sum of the individual saturation pressures of the immiscible vapors at the given condensing temperature. Ambient conditions determine the condensing temperature at the first condenser 18 and at high condensing temperatures (e.g. 40° C.) the first ejector 14 may not be able to produce enough exit pressure to condense both vapors unless the entrainment ratio were significantly lowered and therefore the COP of the system were also lowered.

In the illustrated embodiment, a constant entrainment ratio is allowed even at elevated condensing temperatures by introducing mixed vapors from the first ejector 14 to the absorber 20 within the initial heat exchanger 18. The absorber 20 along with the generator 21 are part of an absorption apparatus. The absorbent fluid of the absorber 20 is used to absorb some of the refrigerant vapor from the mixture exiting the first ejector 14. For example, a Lithium Bromide (LiBr) and water solution with a relatively high LiBr mol fraction can effectively absorb a significant fraction of the water vapor refrigerant leaving the first ejector 14. In one example, the working fluid is generally immiscible with the absorbent to prevent the need to separate the working fluid from the absorbent in a generator, which would lower the COP of the system. In one example, the absorbent may have a low global warming potential and a low ozone depleting potential in order to minimize the climate changing effects associated with fluid leaks during charging, operation, or repair of a refrigeration or cooling system.

Absorbing some of the refrigerant from the first ejector 14 has at least three primary benefits. First, absorbing some of the refrigerant lowers the mol fraction of the refrigerant vapor in the first heat exchanger 18, and therefore, increases the mol fraction and partial pressure of the working fluid to allow for condensation of the working fluid vapor leaving the first ejector 14. Second, absorbing some of the refrigerant lowers the total load on the second ejector 25 which has the important effect of lowering the size and input power needed at the second ejector. Finally, the absorption generates a heat of solution that can be used to pre-heat the working fluid in the second coil 27 in the initial heat exchanger 18 in order to reduce the sensible load on the first working fluid evaporator 12 and therefore increase the COP of the system. By theoretical calculation, the sensible heat needed to raise the temperature of the working fluid from the separator 24 to the evaporating temperature in the first working fluid evaporator 12 may be as much as 50% of the total input energy needed to power the system. The heat transferred to the working fluid in second coil 27 in the initial heat exchanger 18 greatly reduces the amount of sensible heat needed in the first working fluid evaporator 12 to evaporate the working fluid.

The following is an example of suitable operating parameters for the initial heat exchanger 18. In this example, HFE7300 is the working fluid, water is the refrigerant and a strong LiBr and water solution is the absorbent. The exit pressure from the first ejector 14 and inside condenser 18 is set to be about 3500 Pa. The temperature of the first working fluidevaporator 12 is about 120° C. and the temperature within the low temperature evaporator 16 is about 5° C. The ambient temperatures of both the coolant entering the first coil 19 in the initial heat exchanger 18 and the working fluid returning to the first working fluid evaporator from second coil in the initial heat exchanger 27 are about 40° C. Using theoretical calculations, the mol ratio of refrigerant flow to working fluid flow exiting the first ejector 14 and entering the initial heat exchanger 18 is 3:1, i.e. mol fraction of water in the mixture of HFE7300 and water is 75% water. The stagnation temperature of the vapor mixture leaving the first ejector 14 is also calculated to be 83° C., and the specific heat is nearly the same as that of HFE7300.The counter flowing HFE7300 within the second coil 27 absorbs both the heat of solution between the water refrigerant and the LiBr-water absorbent and the sensible heat from the vapor mixture not absorbed by the Li-Br absorbent. To the extent that the second coil 27 is unable to bring the temperature of the mixed vapors and absorbent to the ambient temperature, the separate coolant flows through the first coil 19 to bring the temperatures of the vapors and absorbent to the ambient temperature of 40° C. During the absorption process an estimated 50% of the water vapor entering the initial heat exchanger 18 from the first ejector 14 is absorbed by the strong Lithium Bromide solution. The amount of refrigerant vapor absorbed may vary with working conditions, and selection range may also vary within the scope of the present invention, but, it is believed would typically be in the range of 35% to 65%. The remaining vapor of HFE7300 and water are drawn out by the second ejector 25, and the pressure in the primary heat exchanger 18 would be kept at 3500 Pa by the constant suction pressure into the second ejector. Under these conditions none of the remaining HFE7300 or water vapor would be condensed in the secondary heat exchanger 26. The only liquid collected in the initial heat exchanger 18 (e.g., at the bottom of the exchanger) would be the LiBr-water mixture that results from the absorption process described above. It should be noted that for different combinations of working fluids, the operating temperatures and pressures may be different from that described above. Moreover, some of the working fluid and refrigerant may be condensed in the initial heat exchanger 18.

In order for the absorbent to efficiently absorb the refrigerant vapor, the absorption process must be efficient and the system must be compact. In the illustrated embodiment, the absorber 20 includes one or more miniature or compact jets 186 impinging mixing process or spray process. The spraying or jet impinging of LiBr directly into the mixture of the working fluid and refrigerant fluid flows will result in an increase of the effective contact area between the working/refrigerant fluid vapor and absorbent, which can increase the absorption rate of refrigerant vapor or working fluid and which can reduce the size and the cost of the absorption system employed.

In the illustrated embodiment, the absorption/refrigeration cycle between the initial heat exchanger 18 and the generator 21 is an absorption sub-cycle. The temperature of generator 21 is set to be a relatively high temperature, for example, 120° C., and the pressure in the generator may be slightly greater than 200 kPa. The LiBr weak solution (i.e., A/R mixture) exits the initial heat exchanger 18 with low pressure and is pumped into the generator 21 by a pump 190. In the generator 21, the absorbent-refrigerant mixture is heated to separate the mixture into a refrigerant vapor and a LiBr strong liquid solution. The thermal energy used to heat the absorbent-refrigerant mixture in the generator 21 may originate from the same source used for the first working fluid evaporator 12 (e.g., gas- or biomass-fired heater, a solar energy collector, or a process waste heat source). A pressure drop between the generator 21 and the absorber 20 in the initial heat exchanger 18 causes the absorbent in the generator to flow to the absorber 20. A valve 198 is used to control the mass flow rate of the absorbent to the absorber. The absorbent may be delivered from the generator 21 to the absorber 20 in other ways, including a pump. A heat exchanger 200 transfers heat between the strong absorbent (approx 120° C.) leaving generator 21 and the weak absorbent (approx 40° C.) entering the generator from the initial heat exchanger 18 to lower the temperature of the strong absorbent entering the initial heat exchanger and to raise the temperature of the weak absorbent entering the generator. This heat exchanger 200 improves the system efficiency by raising the amount of refrigerant absorbed in the initial heat exchanger 18, lowering the heat removal energy in the first coil 19 of the initial heat exchanger 18, and lowering the sensible heat required in the generator 21.

Refrigerant vapor leaving generator 21 flows through the coil 22 in the second working fluid evaporator 23 and is condensed into liquid. Working fluid from the separator 24 is pumped by a pump 214 into to the second working fluid evaporator 23, whereby the heat from the vaporized refrigerant in the coil 22 is transferred to the working fluid to vaporize the working fluid. In this way much of the energy penalty associated with use of an absorption system is recovered in the second working fluid evaporator 23. Preferably, the absorbent apparatus is configured so that the heat released by the condensing refrigerant in the coil 22 substantially equals the amount of heat necessary to vaporize the working fluid in the second evaporator 23 to produce the necessary mass flow through the second ejector 25 to aspirate the vaporized working-refrigerant fluid in the first heat exchanger 18. This may affect the amount of refrigerant vapor selected to be absorbed by the absorber 20. Preferably, only enough refrigerant vapor is absorbed to provide the heat when condensed in coil 22 needed to evaporate the working fluid in the second working fluid evaporator 23. However, other factors such as the ambient temperature (i.e., temperature of the environmental cooling source), the desired low temperature evaporator temperature, the heat source temperature in the first primary fluid evaporator 12 and the choice of fluids also affect the amount of refrigerant vapor that is absorbed.

After the condensed refrigerant exits the second working fluid evaporator 23, the refrigerant flows through a heat exchanger 202 where working fluid being pumped from the separator 24 absorbs heat from the condensed refrigerant before the working fluid enters the second working fluid evaporator. In effect, the heat exchanger 202 critically raises the temperature of the working fluid entering second working fluid evaporator 23 to reduce the sensible heat needed in the second working fluid evaporator to vaporize the working fluid and increase the COP of the system. A valve 204 controls the mass flow rate of condensed refrigerant entering the separator 24.

The vaporized working fluid in the second working fluid evaporator 23 flows under high pressure to the second ejector 25. The vaporized working fluid flowing through the second ejector 25 draws the working-refrigerant fluid mixture from the initial heat exchanger 18 into the second ejector. The second ejector in the illustrated embodiment includes a mono-nozzle 205 and a conventional converging-diverging chamber 206. It is contemplated that the second ejector 25 include a multi-nozzle design similar to the first ejector 14, and an intermediate section of the converging-diverging chamber may have a constant rate of momentum change curve, similar to the first ejector. The second ejector 25 provides at least two functions. First, the second ejector 25 maintains a constant pressure in the fluidly connected initial heat exchanger 18. Second, the second ejector 25 compresses the mixed working and refrigerant vapors from the initial heat exchanger 18 to a total pressure exiting the second ejector that is at least as great as the sum of the individual saturation pressures of the working and refrigerant vapors. At this critical total pressure, all of the working and refrigerant vapors exiting the second ejector 25 can be condensed in the secondary heat exchanger 26. It is believed that prior single-stage, immiscible fluid pair ejectors cannot reach this critical pressure without significantly raising the initial temperature and pressure of the working fluid evaporator which has the effect of lowering the total COP of the system and raising the operating costs of the system by a higher quality, higher temperature energy source.

The secondary heat exchanger 26 is simpler than the initial heat exchanger 18, although the secondary heat exchanger may have a design similar to the initial heat exchanger without departing from the scope of the present invention. In that event, for example, some of the heat in the secondary heat exchanger 26 may be used to further pre-heat the working fluid on its way back to the first working fluid evaporator 12. Coolant, such as water or a glycol-water mixture, flows through a coil 210 (broadly, a conduit) in the secondary heat exchanger 26 to absorb heat from the mixed working and refrigerant vapors exiting the second ejector 25. The loss of heat to the coolant flowing through the coil 210 condenses the working fluid and the refrigerant fluid in the secondary heat exchanger 26. The condensed working fluid and the condensed refrigerant flow to the separator. All of the working fluid (e.g., HFE7300) from the first working fluid evaporator 12 and refrigerant (e.g., water) from the low temperature evaporator 16 are in liquid phase when the fluids enter the separator 24. It should be noted that some of the refrigerant goes through the absorption sub-cycle but would come back to separator 24 finally. In one example, the working fluid and the refrigerant are immiscible so that the condensed working fluid and the condensed refrigerant separate in the separator 24 by gravity. As previously stated for the embodiments described herein, HFE7300 can be used as the working fluid and water can be used as the refrigerant. Other fluid pairs are possible, although it is preferred that other fluid pairs meet the following specifications: 1) the fluids have a large difference of the molecular weight; 2) the fluids have a large difference of latent heat; 3) the one fluid with higher latent heat is easily absorbed by the absorbent in the absorption sub-cycle; and 4) the two fluids are immiscible. In the separator 24, the working fluid with higher density and lower latent heat, such as HFE7300, would be located at a bottom of the separator because of its larger density. The refrigerant, with lighter molecular weight and higher latent heat, such as water, floats on top of the working fluid.

The refrigerant in the separator 24 flows from the separator to the low temperature evaporator 16. A valve 212 regulates the flow of the liquid refrigerant R from the separator 24 to the low temperature evaporator 16. A pump or other device may be used to deliver the refrigerant to the low temperature evaporator 16 without departing from the scope of the invention. The working fluid W in the separator 24 is pumped separately to the first working fluid evaporator 12 and to the second working fluid evaporator 23 by respective pumps 214, 216. The pumps, 214, 216 may be of any suitable type, and may be thermally-driven pumps which would allow the entire heat pump 10 to operate without electricity. The pump 216 pumps the working fluid through the second coil 27 of the initial heat exchanger before the working fluid is delivered to the first working fluid evaporator 12. As stated above, the working fluid absorbs heat from the vaporized working-refrigerant mixture in the initial heat exchanger 18 to reduce the amount of heat that the working fluid needs to absorb in the first working fluid evaporator 12 to vaporize the fluid.

Figure 7:
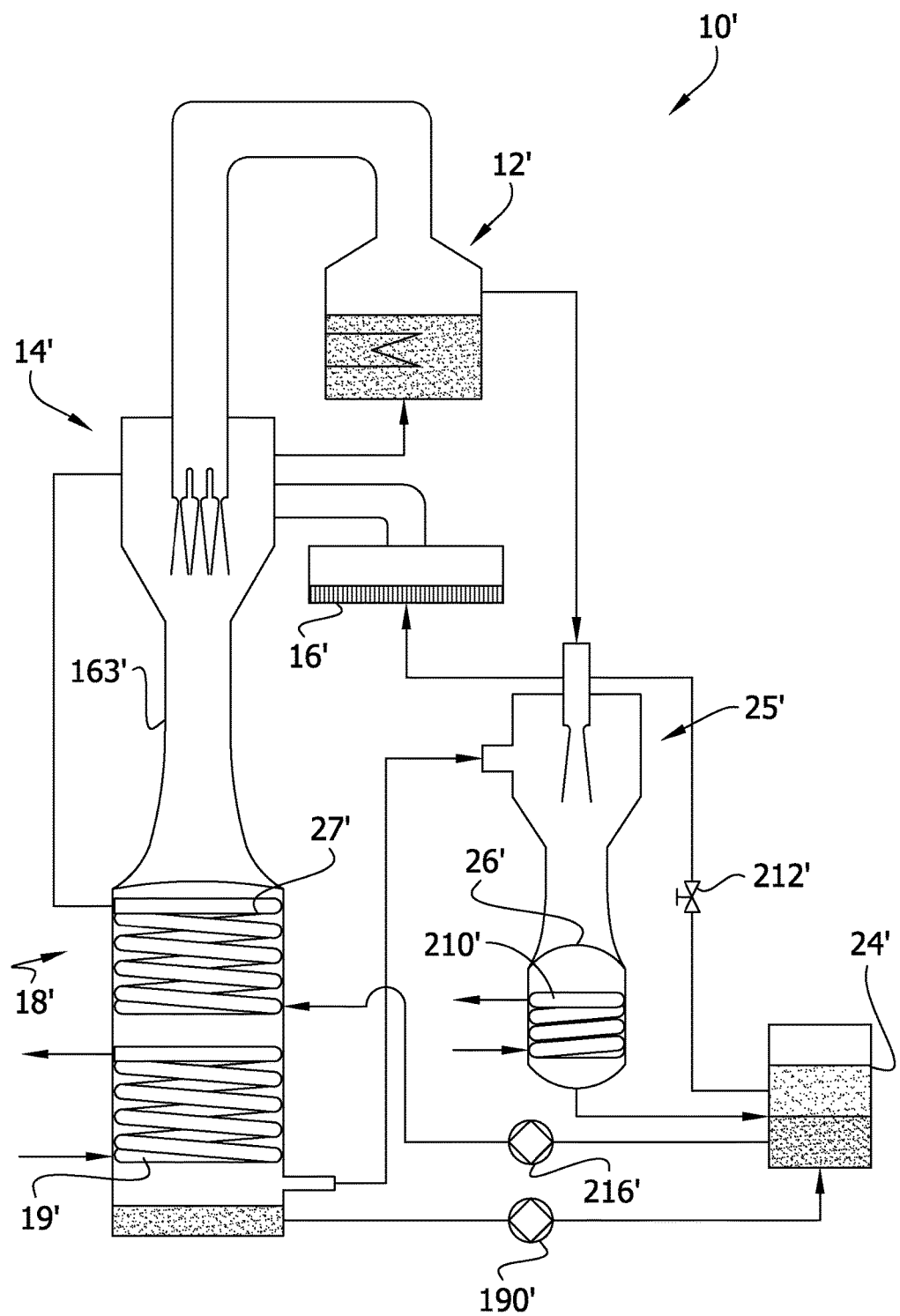
FIG. 7 is a schematic of a second embodiment of a thermally driven heat pump.

Referring now to FIG. 7, a second embodiment of a thermally driven heat pump is generally indicated at 10'. This embodiment is similar to the first embodiment, with like components indicated by corresponding reference numerals plus a single prime. The second embodiment of the thermally driven heat pump 10' has a simpler structure that the first embodiment because the second embodiment does not include an absorption apparatus. A single working fluid evaporator 12', similar to the first working fluid evaporator 12 of the first embodiment, supplies vapor working fluid to both a first ejector 14' and a second ejector 25'. Using the vaporized working fluid, the first ejector 14' draws in vaporized refrigerant fluid from a low temperature evaporator 16'. The first ejector 14' may be similar in structure to the first ejector 14 in the first embodiment. The vaporized working-refrigerant mixture is entrained in the first ejector 14' and flows into an initial heat exchanger 18'. At the initial heat exchanger 18', coolant is pumped through first coils 19' and condensed working fluid is pumped through second coils 27' to remove heat from the vapor mixture. A portion of the vapor mixture may condense depending on the components partial pressure and the total pressure in the primary heat exchanger. The portion of the mixture that is condensed is delivered to a separator 24' using a pump 190'. The condensed working fluid and the condensed refrigerant separate in the separator 24'. The portion of the mixture that remains vapor is drawn into the second ejector 25'. In the second ejector, the working fluid vapor and the refrigerant vapor are entrained and flow into a second heat exchanger 26' where the vapor mixture is substantially completely condensed. The condensed working fluid and refrigerant are delivered to the separator 24' where the fluids are separated. From the separator 24', the condensed refrigerant flows to the low temperature evaporator 16'. A valve 212' controls the flow of the condensed refrigerant to the low temperature evaporator 16'. The condensed working fluid in the separator 24' flows through the second coil 27' in the initial heat exchanger 18' before the fluid is delivered to the working fluid evaporator 12' using a pump 216'.

Figure 8:
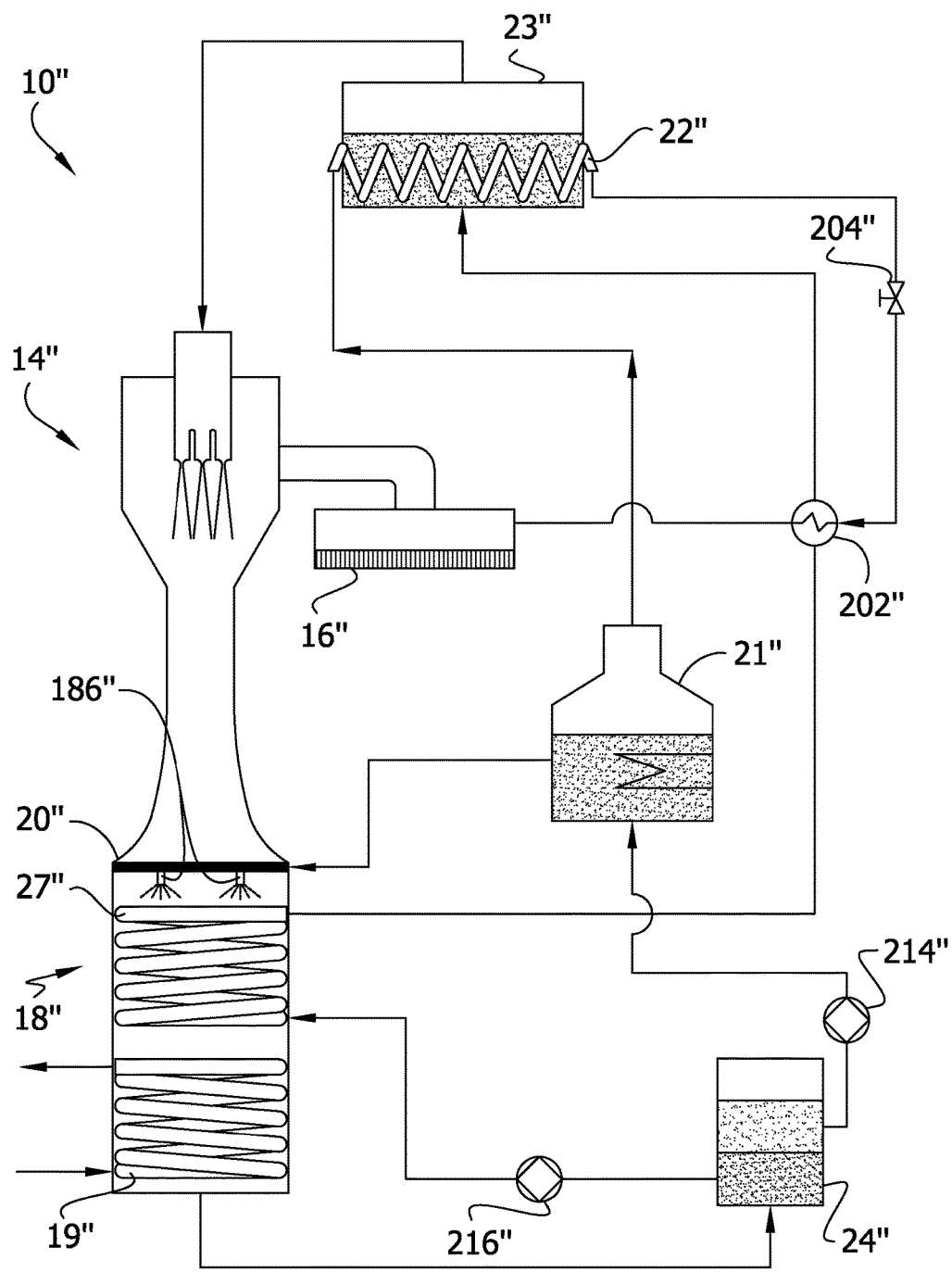
FIG. 8 is a schematic of a third embodiment of a thermally driven heat pump.

Referring to FIG. 8, a third embodiment of a thermally-driven heat pump is generally indicated at 10". This embodiment is similar to the first embodiment, with like components indicated by corresponding reference numerals plus a double prime. The third embodiment of the thermally driven heat pump 10" is different than the first embodiment in that the third embodiment includes a single working fluid evaporator 23", similar to the second working fluid evaporator 23 in the first embodiment, and does not include a second ejector. The working fluid evaporator 23" supplies vapor working fluid to an ejector 14", which may be similar to the ejector 14 in the first embodiment. The ejector 14" draws in vaporized refrigerant fluid from a low temperature evaporator 16". The vaporized working fluid and the vaporized refrigerant fluid are entrained in the ejector 14" and flow into a heat exchanger 18", which is similar to the heat exchanger 18 in the first embodiment. An absorber 20" in the heat exchanger 18" releases absorbent that absorbs some of the refrigerant vapor. Coolant flowing through first coils 19" and working fluid flowing through second coils 27" remove heat from the working-refrigerant vapor mixture. The working-refrigerant vapor mixture condenses in the heat exchanger 18", and the condensed fluids flow into a separator 24" where they separate into a layer of absorbent-refrigerant liquid and a layer of working fluid liquid. From the separator 24", the working fluid liquid is pumped, via pump 216", through the second coil 27" of the heat exchanger 18" to the working fluid evaporator 23". The absorbent-refrigerant liquid is pumped, via pump 214" to a generator 21" where the refrigerant is separated from the absorbent by vaporizing the refrigerant. From the generator 21", the absorbent is delivered to the absorber 20" at the heat exchanger 18". The vaporized refrigerant is delivered through a coil 22" in the working fluid evaporator 23" where heat from the refrigerant is absorbed by the refrigerant to vaporize the refrigerant. The refrigerant condenses in the coil 22" and flows through a heat exchanger 202" to transfer additional heat to the working fluid before the working fluid enters the working fluid evaporator 23". A valve 204" controls the flow of refrigerant from the coil 22". From the heat exchanger 202", the refrigerant flows to the low temperature evaporator 16".

Having described the invention in detail, it will be apparent that modifications and variations are possible without departing from the scope of the invention defined in the appended claims. It is envisioned that the cooling system described herein can be used in numerous situations where cooling and/or heating is needed. The compact size of the system makes it applicable to automobiles. There, waste heat from the engine cooling circuit and/or exhaust gases can be used to drive the cooling system described above.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A thermally driven heat pump comprising:
   a low temperature evaporator for evaporating a cooling fluid to remove heat;
   a primary fluid evaporator for evaporating primary fluid by application of heat;
   an ejector including a converging/diverging chamber, nozzle apparatus in fluid communication with the primary fluid evaporator to receive the primary fluid vapor and to eject the primary fluid vapor into the converging/diverging chamber, the low temperature evaporator being in fluid communication with the converging/diverging chamber so that cooling fluid vapor from the low temperature evaporator is aspirated into the converging/diverging chamber;

a heat exchanger located at an outlet of the converging/diverging chamber of the ejector for receiving a flow of the primary fluid vapor and the cooling fluid vapor ejected from the ejector for condensing a portion of at least one of the cooling fluid vapor and the primary fluid vapor;

absorption apparatus located at the outlet of the converging/diverging chamber, the absorption apparatus including an absorber associated with the heat exchanger for absorbing the cooling fluid vapor into an absorbing fluid thereby to reduce a pressure in the heat exchanger;

a generator for separating the cooling fluid from the absorbing fluid; and a separator in fluid communication with the heat exchanger, the low temperature evaporator and the primary fluid evaporator for use in separating the primary fluid from the cooling fluid for returning to the low temperature evaporator and the primary fluid evaporator, respectively.

2. A thermally driven heat pump as set forth in claim 1 wherein the absorption apparatus comprises at least one sprayer arranged to spray the absorbing fluid into a flow of the cooling fluid and the primary fluid exiting the outlet of the converging/diverging chamber.

3. A thermally driven heat pump as set forth in claim 1 in combination with the absorbing fluid and the primary fluid, wherein the absorbing fluid is immiscible with the primary fluid.

4. A thermally driven heat pump as set forth in claim 1 further comprising a return conduit extending between the separator and the primary fluid evaporator, the return conduit being in thermal communication with the generator for transferring heat from the cooling fluid leaving the generator to primary fluid in the return conduit.

5. A thermally driven heat pump as set forth in claim 1 further comprising a conduit between the heat exchanger and the generator for delivering a solution of the absorbing fluid and cooling fluid absorbed by the absorbing fluid to the generator, the conduit being in thermal communication with the generator for transferring heat from the absorbing fluid leaving the generator to the solution of the absorbing fluid and the cooling fluid entering the generator.

6. A thermally driven heat pump as set forth in claim 1 wherein the primary fluid is immiscible with the cooling fluid for separation by gravity from the cooling fluid in liquid phase and wherein the primary fluid and cooling fluid have global warming potentials of less than about 1000, the primary fluid being different from the cooling fluid and comprising a hydrofluoroether.

7. A thermally driven heat pump as set forth in claim 6 wherein the ratio of a molecular weight of the primary fluid to a molecular weight of the cooling fluid is at least about 5.0.

8. A thermally driven heat pump as set forth in claim 6 wherein the ratio of a heat of vaporization of the cooling fluid to a heat of vaporization of the primary fluid is at least about 2.0.

9. A thermally driven heat pump as set forth in claim 6 wherein the primary fluid evaporator includes a liquid reservoir compartment containing condensed cooling fluid, heat pipes and a wick separating the liquid reservoir compartment from the heat pipes, the wick being adapted to draw the cooling fluid through the wick and into the heat pipes, each heat pipe having an internal surface structure having microwicks for use in thin film evaporation of primary fluid.

10. A thermally driven heat pump as set forth in claim 6 wherein the low temperature evaporator includes a liquid reservoir compartment containing condensed cooling fluid, heat pipes and a wick separating the liquid reservoir compartment from the heat pipes, the wick being adapted to draw the cooling fluid through the wick and into the heat pipes, each heat pipe having an internal surface structure having microwicks for use in thin film evaporation of cooling fluid.

11. A thermally driven heat pump as set forth in claim 6 further comprising:

a second ejector including a converging/diverging chamber, a nozzle apparatus for ejecting primary fluid vapor into the second ejector's converging/diverging chamber at high speed, the heat exchanger being in fluid communication with the converging/diverging chamber of the second ejector so that cooling fluid vapor and the primary fluid vapor in the heat exchanger are aspirated into the converging/diverging chamber of the second ejector;

a second heat exchanger located at an outlet of the converging/diverging chamber of the second ejector for removing heat from vapors and the primary fluid vapor to cool the cooling fluid vapor and the primary fluid vapor to facilitate condensation; and a conduit to connect the second heat exchanger to the separator.

12. A thermally driven heat pump as set forth in claim 11 wherein the primary fluid evaporator constitutes a first primary fluid evaporator, the heat pump further comprising a second primary fluid evaporator for evaporation of primary fluid by application of heat, the second primary fluid evaporator being in fluid communication with the second ejector.

13. A thermally driven heat pump as set forth in claim 6 further comprising a return conduit containing the primary fluid connected to the separator and to the primary fluid evaporator for returning primary fluid to the primary fluid evaporator, wherein the return conduit is in thermal communication with the heat exchanger for pre-heating the primary fluid returning to the primary fluid evaporator.

14. A thermally driven heat pump as set forth in claim 6 wherein the converging/diverging chamber is shaped so that the velocity of the combined flow of the primary fluid and the cooling fluid is about Mach 1 at a throat of the converging/diverging chamber.

15. A thermally driven heat pump as set forth in claim 1 wherein the converging/diverging chamber has an inner wall, a centerline and an inlet adapted for connection to the low temperature evaporator for aspirating vaporized cooling fluid from the evaporator, and a rotating section rotatable about the centerline of the converging/diverging chamber, the rotating section including projections extending inwardly from the inner wall of the converging/diverging chamber and into the flow of the primary fluid and the cooling fluid in the converging/diverging chamber, the projections being arranged to mix the cooling fluid with the primary fluid, the projections being shaped to convert some of the kinetic energy of the flow of primary fluid and cooling fluid to rotational movement of the rotating section for mixing the primary fluid and cooling fluid.

* * * * *